(12) United States Patent
Cao

(10) Patent No.: US 6,865,179 B1
(45) Date of Patent: Mar. 8, 2005

(54) APPARATUS AND METHOD FOR SYNCHRONOUS AND ASYNCHRONOUS TRANSFER MODE SWITCHING OF ATM TRAFFIC

(75) Inventor: Yang Cao, Bradford, MA (US)

(73) Assignee: Lucent Technologies Inc., Murray Hill, NJ (US)

( * ) Notice: Subject to any disclaimer, the term of this patent is extended or adjusted under 35 U.S.C. 154(b) by 874 days.

(21) Appl. No.: 09/619,778

(22) Filed: Jul. 20, 2000

(51) Int. Cl.[7] .............................................. H04L 12/66
(52) U.S. Cl. ................... 370/352; 370/355.21; 370/369
(58) Field of Search ................................ 370/352–356, 370/400, 401, 395.1, 395.21, 395.43, 369, 229, 465, 395.2, 232, 389, 395.64, 399, 338, 329, 398

(56) References Cited

U.S. PATENT DOCUMENTS 6,151,315 A * 11/2000 Ash et al. .................... 370/352
6,314,103 B1 * 11/2001 Medhat et al. ........... 370/395.2
6,381,238 B1 * 4/2002 Hluchyj ...................... 370/352
6,522,663 B1 * 2/2003 Bharucha et al. ........... 370/465
6,646,985 B1 * 11/2003 Park et al. ................... 370/229

* cited by examiner

Primary Examiner—John Pezzlo

(57) ABSTRACT

A hybrid telecommunications switch includes synchronous transfer mode (STM) and asynchronous transfer mode (ATM) switch fabrics, and a controller. The controller is configured to separate incoming ATM from STM traffic and to provide access, through a connection admission control (CAC) protocol to an STM fabric for ATM traffic. In one aspect of the invention, real-time traffic, such as voice traffic, may be separated from non-real-time traffic, such as Internet email traffic. Once separated, the real time traffic may be switched through a circuit switch fabric and the non-real-time traffic may be switched through a packet switch fabric. ATM traffic, such as CBR and rt-VBR may aggregated "on-the-fly", that is, without pre-provisioning, and switched through the hybrid switch's circuit switch fabric. ATM traffic falling into other categories is routed through a packet switch fabric.

41 Claims, 5 Drawing Sheets

APPARATUS AND METHOD FOR SYNCHRONOUS AND ASYNCHRONOUS TRANSFER MODE SWITCHING OF ATM TRAFFIC

FIELD OF THE INVENTION

The invention relates to telecommunications systems and, more particularly, to the efficient switching of both synchronous and asynchronous transfer mode telecommunications traffic.

BACKGROUND OF THE INVENTION

In eighteen seventy-six, inside a third floor walk-up garret apartment in the Scollay Square section of Boston Mass., only a short distance from the sight of the first battle of the revolutionary war, Alexander Graham Bell spoke the first words transmitted over telephone wires. Bell's transmission of sound over telephone wires initiated a revolution in communications whose scope rivals that of the political revolution initiated by the sound, heard nearby, of "the shot heard round the world."

Technical innovations have dramatically transformed the telecommunications industry in the ensuing years. For example, telecommunications switching systems have evolved considerably from "hand operated" systems in which one instrument was electrically connected (through a hierarchical switching network) to another with the intervention of a human operator who would physically plug one circuit into another. Such direct electrical connection of two or more channels between two points (at least one channel in each direction), a connection that provides a user with exclusive use of the channels to exchange information, is referred to as circuit switching, or line switching. Human operators have largely been replaced by systems which employ electronic switching systems (ESS, e.g., 5ESS), in which the instruments are automatically connected through the network by electronic systems. Nevertheless, such switching systems often still employ circuit switching, a technique which yields highly reliable service, particularly for such "real time" communications applications as voice, in which the momentary loss of a channel is annoying, and repeated such losses are unacceptable.

Not only has switching technology undergone major changes, the type of traffic being carried on telephone lines has also changed dramatically. Although originally designed for voice traffic and "tuned" to operation in the voice band between approximately 350 and 4000 Hz, the telecommunications infrastructure also carries data, through the use of various channels, or tones. However, with the growing use of the Internet, and the potential development such high bandwidth applications such as interactive distance-learning and video on demand, the existing telecommunications infrastructure is in danger of being overwhelmed. A large portion of the system's transmission medium has been replaced with high speed trunks which employ fiber optic transmission media, microwave media, and line of sight optical media, for example, to meet the ever mounting demand for high speed data transmission capability. Data traffic is increasing at a rate of approximately 300% per year, while voice traffic is only increasing at the relatively slow rate of approximately 5% per year. However, a huge installed base of transmission media, switching devices, and other telecommunications infrastructure provide the telecommunications path for the vast majority of telecommunications providers and users.

Various quality of service categories are supported by ATM and their varied requirements exacerbate the difficulty of modeling an ATM compatible switching system. Consequently, many conventional ATM systems either employ conservative systems modeling, which results in underutilized facilities such as bandwidth and/or buffers, or aggressive modeling, which degrade system performance.

A system and method that enable the efficient combination and management of circuit-switched and packet-switched facilities, thereby taking advantage of the tremendous installed base of equipment and facilities while, at the same time, permitting an extensive upgrade of data facilities, which typically employ packet switching systems, would therefore be highly desirable.

RELATED APPLICATIONS

Patent Applications entitled, "Apparatus and Method For Hybrid Switching", and "Apparatus and Method For Synchronous and Asynchronous Switching of Internet Protocol Traffic", filed on the same day as this application and assigned to the same assignees as this application is assigned are hereby incorporated by reference.

SUMMARY

A telecommunications management system and method in accordance with the principles of the present invention includes facilities for managing telecommunications switching in a system that includes both circuit switching and packet switching facilities. The circuit switching facilities may use a Synchronous Transport Signal (STS) crossconnect with interfaces to SONET rings, for example, while the packet switching facility switches ATM cells. In one aspect of the invention, real-time traffic, such as voice traffic, may be separated from non-real-time traffic, such as Internet email traffic. Once separated, the real time traffic may be switched through a synchronous transfer mode (STM) switch fabric, which may also be referred to herein as a circuit-switched switch or time division multiplexed (TDM) switch fabric. The non-real-time traffic may be switched through an asynchronous transfer mode (ATM) switch fabric.

In accordance with the principles of the present invention a hybrid switch includes packet and circuit switching switch fabrics, a hybrid switch manager and one or more input/output ports (I/O port). Telecommunications traffic enters the switch and, after the traffic is switched, departs to telecommunications network through the I/O port(s). A new connection admission control (CAC) process is employed by the hybrid switch manager to route ATM traffic to either an STM switch fabric or an ATM switch fabric. Because the traffic load is shared, in parallel fashion, between the STM and ATM fabrics, neither switch need be of sufficient magnitude to accommodate the entire traffic load. In an illustrative embodiment "real-time" ATM traffic, such as CBR and rt-VBR are aggregated "on-the-fly", that is, dynamically, without pre-provisioning, and switched through the hybrid switch's STM switch fabric. ATM traffic falling into other categories is routed through an ATM switch fabric. As a result, a hybrid switch in accordance with the principles of the present invention provides efficient use of STM and ATM switch fabrics, the overall bandwidth of the switch, and buffers used for access to the switch.

In accordance with the principles of the present invention all ATM CBR traffic may be aggregated and switched through STM switch fabric(s) and ATM rt-VBR traffic may be switched through an ATM switch fabric in a conventional manner or it may be switched in the same fashion as ATM CBR traffic.

BRIEF DESCRIPTION OF THE DRAWINGS

The above and further features, aspects, and advantages of the invention will be apparent to those skilled in the art from the following detailed description, taken together with the accompanying drawings in which.

DETAILED DESCRIPTION

Figure 1:
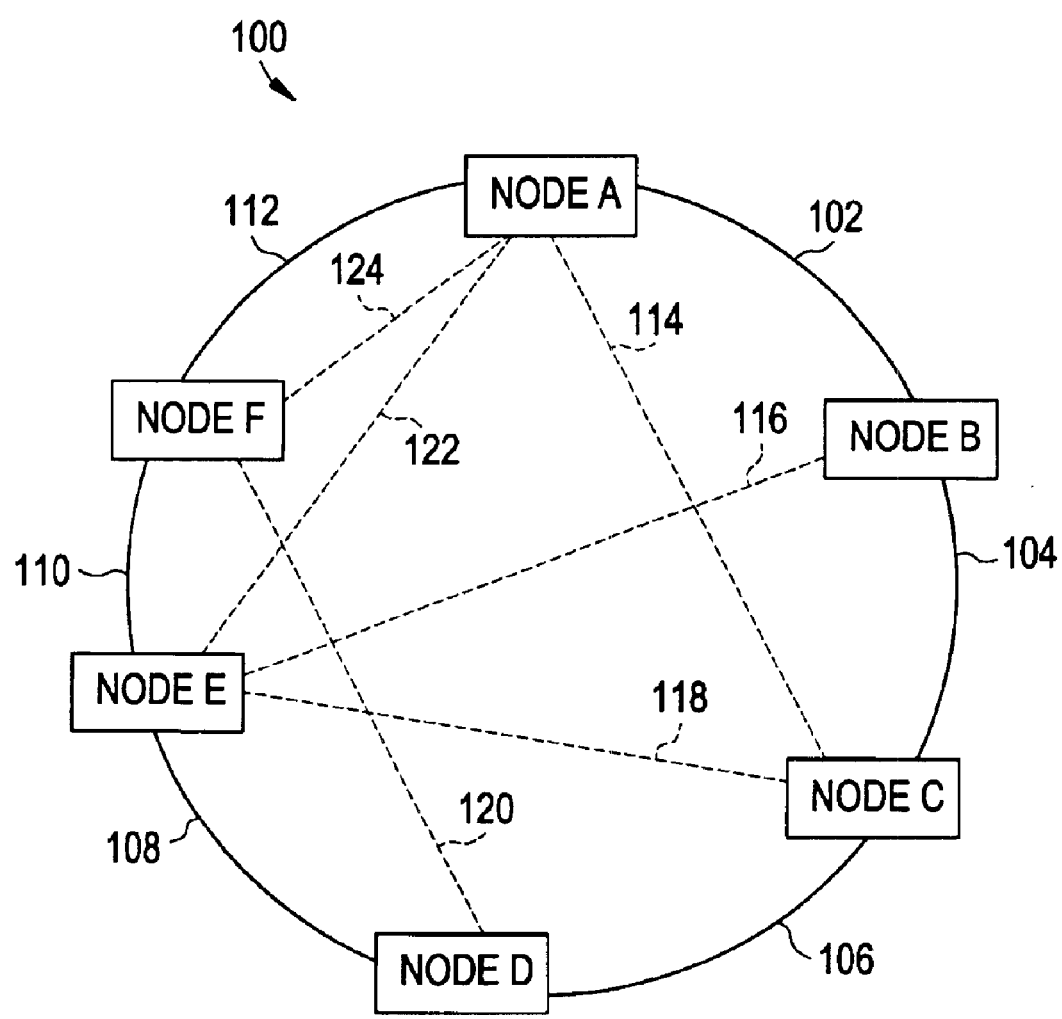
FIG. 1 is a conceptual block diagram which illustrates a network of hybrid switches in accordance with the principles of the present invention.

A hybrid telecommunications switch in accordance with the principles of the present invention includes both circuit switching and packet switching facilities and a management system and method for allocating traffic among the switching facilities. The circuit switching facilities may employ a Synchronous Transport Signal (STS) cross-connect with interfaces to SONET rings, for example, and the packet switching facility may use an ATM switch fabric for switching traffic in the form of ATM packets or cells. In one aspect of the invention, traffic for which circuit switching may be more appropriate may be separated from traffic that is more suitably handled by packet switching facilities. That is, for example, real-time traffic, such as voice traffic, may be more appropriately handled by a circuit switching facility, and non-real-time traffic, such as Internet email traffic, may be more suitably handled by a packet switching facility. After separation, the real-time traffic may be switched through an STM switch fabric and the non-real time traffic, which may be ATM traffic of types described below, may be switched through a packet switch fabric.

The new hybrid switches may be connected in any of a variety of network topologies. For ease and clarity of description, the illustrative embodiment of FIG. 1 includes six hybrid switches in accordance with the principles of the invention (Node A, Node B, Node C, Node D, Node E and Node F) that are connected in a ring 100, in which Nodes A and B are connected through a link 102, Nodes B and C are connected through a link 104, Nodes C and D are connected through a link 106, Nodes D and E are connected through a link 108, Nodes E and F are connected through a link 110, and Nodes F and A are connected through a link 112. As described in greater detail in the discussion related to FIGS. 2 and 3, each of the Hybrid switches (any of the nodes Node A through Node F) includes STM switch fabric facilities, ATM switch fabric facilities, Input/Output facilities and a switch manager that, in accordance with principles of the invention, examines incoming traffic and route the traffic to an appropriate switching facility within the hybrid switch. As previously noted, the invention may apply to other network topologies, such as meshes (wherein the nodes A through F may be connected through links 114, 116, 118, 120, 122, and 124, for example). Additionally, within the context of a ring topology, each of the nodes may be connected to a plurality of rings. The illustrative embodiment of FIG. 1 was chosen for clarity and simplicity of explanation. Furthermore, although the invention will be discussed in the context of employing a SONET/SDH physical link media, the invention may be used in conjunction with networks that employ other physical media.

Figure 2:
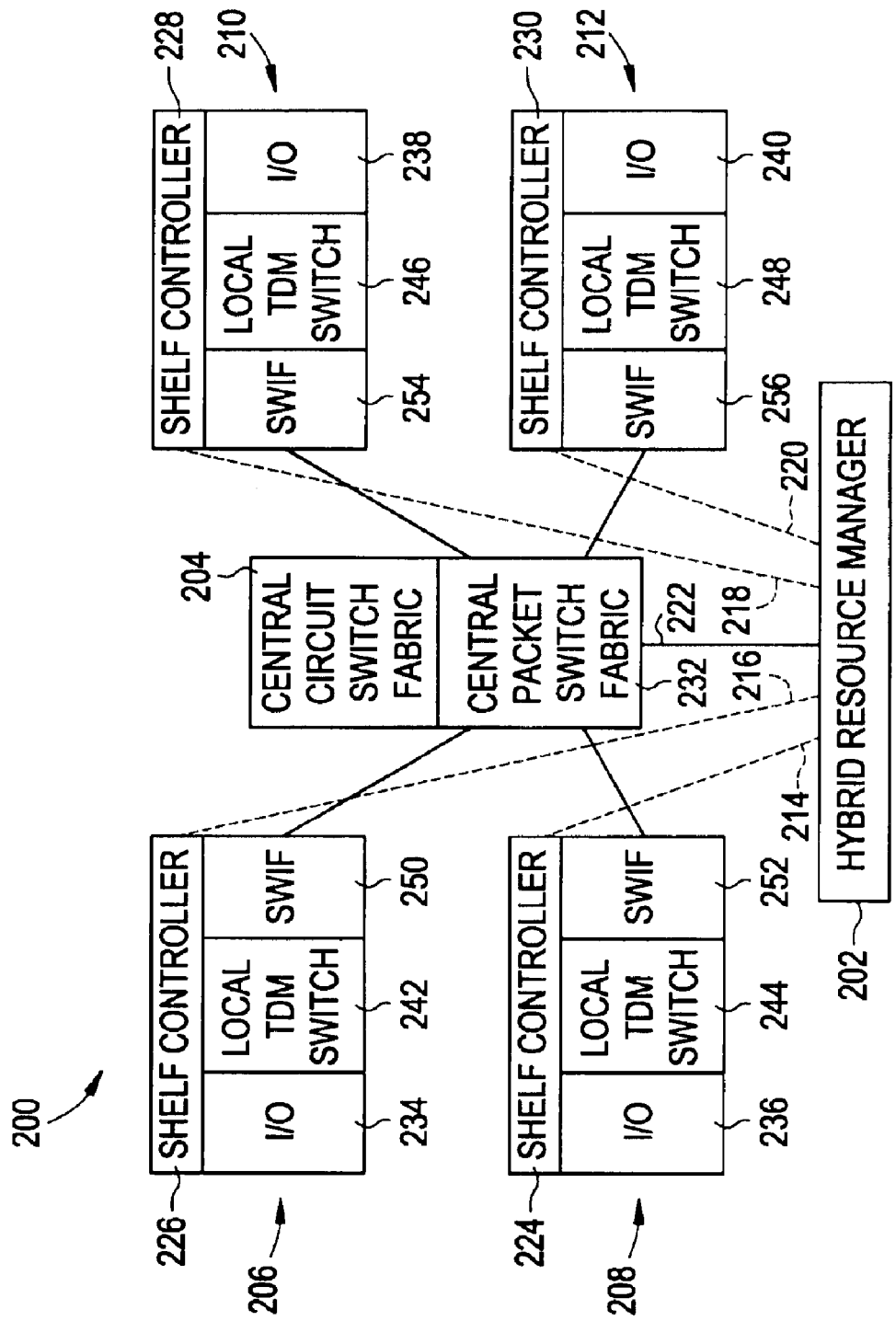
FIG. 2 is a conceptual block diagram of a hybrid telecommunications switch in accordance with the principles of the present invention.

Each of the Nodes A through F of FIG. 1 includes components such as illustrated in the conceptual block diagram of FIG. 2. The node 200 includes a controller, which will hereinafter be referred to as a hybrid resource manager 202, a central circuit switch fabric 204, a central packet switch fabric 232, and a plurality of STM units 206, 208, 210, and 212. The hybrid resource manager 202 operates to manage the switch resources through respective communications links 214, 216, 218, 220, and 222 to shelf controllers 224, 226, 228, 230, and a central packet switch fabric 232. The central packet switch fabric is an asynchronous transfer mode (ATM) switch fabric. The STM units 206, 208, 210 and 212 respectively include input/output (I/O) interfaces 234, 236, 238, and 240, local switch fabrics, 242, 244, 246, and 248, and switch interfaces, 250, 252, 254, and 256. An I/O interface, such as I/O interface 234 may provide a connection to another network element, or node, through a link such as the link 102 which connects nodes A and B of FIG. 1. Traffic arriving at one of the I/O interfaces is routed under control of the hybrid resource manager 202 by a shelf controller which more directly controls the operation of a local STM switch. Each of the local STM switches may be, for example, an STS-1 level cross-connect. The capacity of the cross-connect may be related to the I/O capacity of the corresponding I/O interface. That traffic which is routed to the central packet switch fabric 232 may be directed through a switch interface, such as SWIF 250, embodied as an advanced "UTOPIA" interface which is capable of transferring both ATM cells and packet-based traffic.

As described in greater detail in the discussion related to FIGS. 2, 3, 4 and 5, the hybrid resource manager partitions incoming traffic into streams that are to be switched either by an STM switch fabric or an ATM switch fabric. The STM traffic may be switched in a local STM switch, such as local TDM switch 242, for example, or it may be switched through a central STM switch fabric 204 (optional). Typically, a single ring SONET/SDH embodiment would require only one STM unit, such as the unit 206, to provide an interface to the ring and to provide the STM switching function. A multi-ring or mesh connection would include a plurality of the STM units, as illustrated. In such as case, the STM switching may be provided by a central STM switch fabric 204 which could direct traffic into and out of any of the I/O interfaces and to the packet switch fabric 232, as needed. Alternatively, traffic entering one STM unit could be packetized and switched through the central packet switch fabric 232 to travel between I/O interface 234 and I/O interface 240, for example. Each of the I/O interfaces, such as I/O 234, acts as a ring, or line, interface. The hybrid resource manager 202 communicates with the next node in a path of which it is a part and determines, "on the fly", which switch fabric, such as a local TDM 242, central packet 232 or central circuit 204, will be employed to switch traffic associated with a particular ATM service category.

For each inter-connecting link, such as link 102 between nodes A and B, the total bandwidth of the link is partitioned into a plurality of units and these units are allocated to STM or ATM traffic. If the packet switch fabric 232 supports a UTOPIA-II interface, the basic unit is an STS-1. If the switch fabric 232 supports a UTOPIA-III interface, the unit is an STS-3C. For example, if the link 102 is an OC 192 link, and the switch fabric supports UTOPIA-III, the link is partitioned into 64 OC-3C based units. For each unit, there is one entry in an ingress and egress resource table, as follows:

Ingress Resource Table:

TABLE 1

| Tributary No. | Free Flag | Destination Address | Available Bandwidth | Status: Drop / Pass |
|---|---|---|---|---|
| | | | | |

Egress Resource. Table:

TABLE 2

| Tributary No. | Free Flag | Destination Address | Available Bandwidth | Status: Add / Pass |
|---|---|---|---|---|
| | | | | |

The destination Address is either based on the IP address for this node or a proprietary address: For each ingress link, there is one ingress resource table associated with it. Correspondingly, there is one egress resource table for each egress link. It is assumed that there is at least one entry in each link's resource table.

At initialization time, all the free flags are initialized to have the value 0, indicating that the link is free. The available Bandwidth entry takes the initial value of the link's total physical transmission bandwidth, the Destination Address is initialized as 0, and Status is initialized as either Add (egress link) or Drop (ingress link).

At run time the various tributaries' resources may be allocated for different traffic categories with the allocations reflected in the ingress and egress resource tables. For example, resources may be allocated to CBR traffic from tributaries, starting with a top tributary number and working the way down, while other service categories may be allocated resources from the bottom up. Assume, for example that an egress link is an OC192 link. The link may be partitioned into 64 OC3 tributaries, in which case the link's associated egress table would have 64 entries, one for each tributary (also referred to herein as link traffic units). As traffic requests are received at the node (hybrid switch), resources are allocated, as set forth in greater detail in the discussion related to FIG. 4, to service the traffic. A synchronous payload envelope (SPE) mapper may be configured to encapsulate a specific number of channels on the egress link. For example, two OC3C channels provisioned as non-path terminated at the next node, and an OC192 that is provisioned as path terminated at the next node. Additionally, the STS pointer processor of the inbound OC192 link on the next node would be configured to recognize and process these channels, again, as set forth in greater detail in the discussion related to FIG. 4. Traffic received at the "next" node will be processed first by the STS pointer processor in the nodes' I/O shelf, the two OC3C channels may then be served directly by a local STS crossconnect, thus avoiding the necessity of further processing though the UTOPIA interface. The OC192 channel may be sent directly to a centralized ATM switch for further processing through a UTOPIA interface.

A number of ATM service categories, with their attendant quality of service requirements, have been defined and are listed in table 3:

TABLE 3

| Service Category | QoS |
|---|---|
| CBR | $CLR \leq \epsilon$ |
| | $CDV \leq \delta$ |
| | $MaxCTD \leq \gamma$ |

TABLE 3-continued

| Service Category | QoS |
|---|---|
| rt-VBR | $CLR \leq \epsilon$ |
| | $CDV \leq \delta$ |
| | $MaxCTD \leq \gamma$ |
| nrt-VBR | $CLR \leq \epsilon$ |
| UBR | Best Effort |
| ABR | $CLR \leq \epsilon$ |

Where:
CLR = cell loss rate
CDV = cell delay variation
MaxCTD = maximum end-to-end cell transfer delay and $\epsilon$, $\delta$ and $\gamma$ are the corresponding system requirements.

In accordance with the principles of the present invention, traffic falling within the CBR and rt-VBR categories may be treated as "real-time" and switched through a hybrid switch's STM switch fabric. Each incoming ATM connection request is passed to the hybrid resource manager 202 which determines how the traffic is to be switched. In accordance with the principles of the present invention, specific types of ATM requests indicate that the associated ATM traffic is to be switched through a STM switch fabric within the hybrid switch. In this illustrative embodiment, all CBR type ATM traffic is routed by the hybrid resource manager 202 to an STM switch fabric, such as local TDM switch 242, or central STM switch fabric 204.

Figure 3:
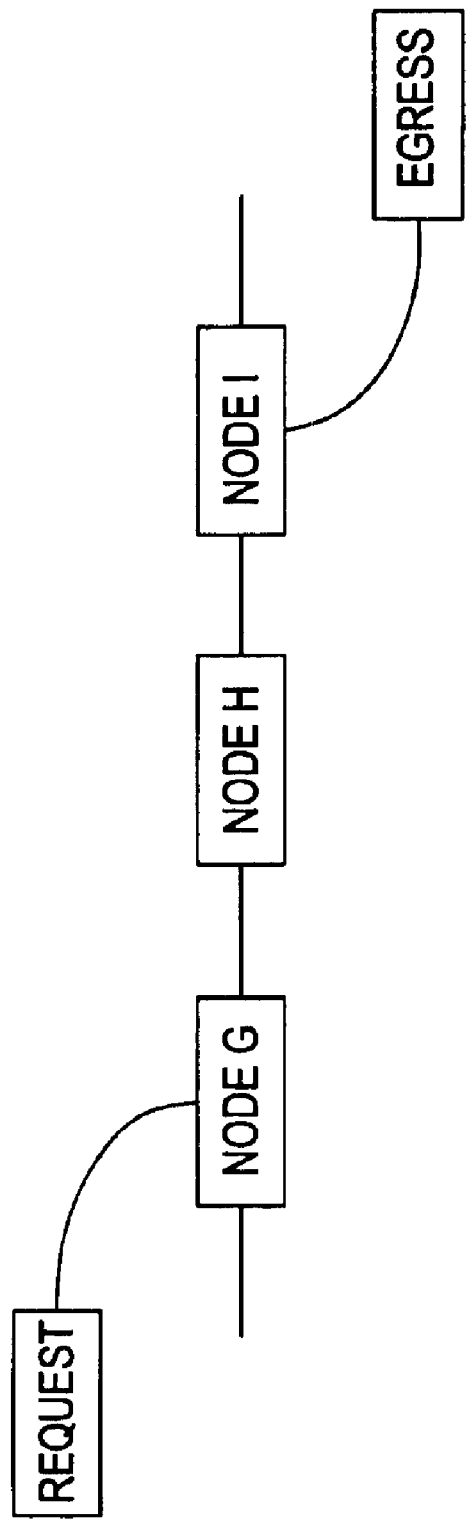
FIG. 3 is a conceptual block diagram of a telecommunications system that employs a plurality of hybrid switches in accordance with the principles of the present invention.

An overview of the process by which the resource manager 202 handles ATM connection requests will be provided in a discussion related to the conceptual block diagram of a three-Node telecommunications system of FIG. 3. Each of the nodes, G through I, is a hybrid telecommunications switch in accordance with the principles of the present invention. Assuming that CBR type ATM traffic originates at Node G and has a destination of Node I STM bandwidth that has already been provisioned for ATM traffic within each of the nodes, and other resources, such as buffer space, is dynamically allocated to the CBR request. For example an ATM request originating at Node G with a destination of Node I would be passed along to Node I and with each subsequent node along the path examining its routing table, as well as the availability of buffers and ingress and egress bandwidth.

Each node's hybrid resource manger could perform this operation. Each node in the path determines whether it has the available resources, whether for pass-through or destination operations, depending upon whether it's routing table indicates it is the destination node or not. If each node within the path has the available capacity (for example, ingress and egress bandwidth and buffers), the destination node affirms the ATM request and this affirmation is returned, node to node, to the ingress node (Node G in this example). In this way, resources, including STM switch fabrics within each node, are dynamically provisioned for CBR type ATM traffic in the illustrative network.

Figure 4:
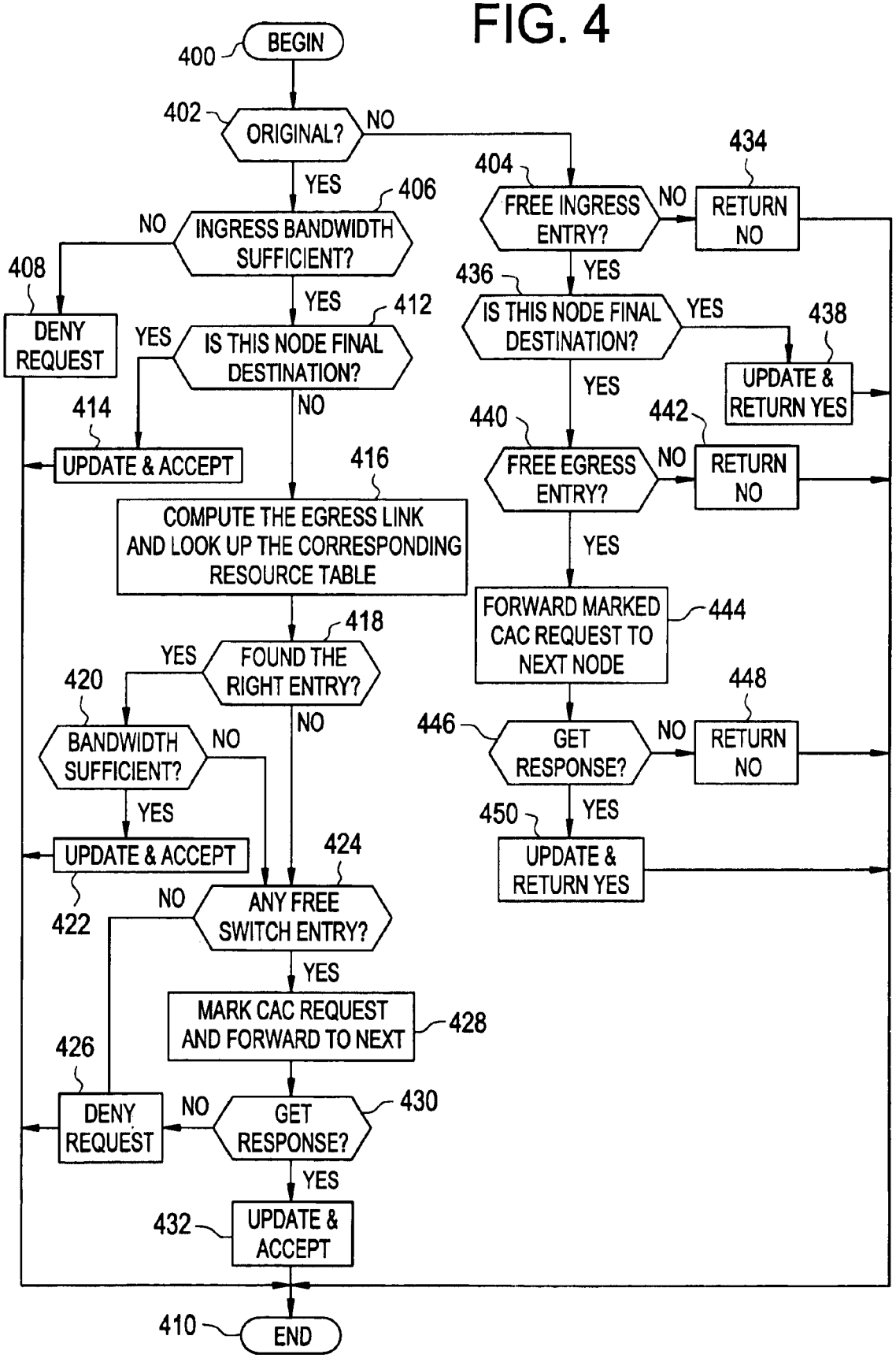
FIG. 4 is a flow chart that depicts the switching of ATM CBR traffic in a hybrid switch in accordance with the principles of the present invention.

The flowchart of FIG. 4 illustrates in greater detail the process by which the resource manager 202, through connection admission control, determines the manner in which ATM traffic is to be switched, should the incoming service request indicate that the traffic is CBR traffic. The process begins in step 400, where the resource manager 202 determines that a received connection request is a CBR request. In this illustrative embodiment, all CBR type ATM requests are routed to a STM switch fabric for switching. The process then proceeds to step 402, where the resource manager 202 determines whether the ATM connection request is an "original" CBR request. That is, the resource manger 202 determines whether the node receiving the request, the node associated with the resource manager, is the first node to receive the request, or the request is a pass-through request. If the request is not an original request, the process branches to step 404, which step will be described below.

If the request is an "original" request, the process proceeds to step 406, where the resource manager determines whether the switch has sufficient ingress bandwidth to service the request. If there is not sufficient bandwidth for the request, the resource manager denies the request in step 408 and the process proceeds to end in step 410. Bandwidth may be provisioned for different ATM service categories in a variety of ways. For example, all link traffic units, such as OC-3C traffic units, as previously discussed, may initially be "free", and their availability would be reflected by a "0" entry in a corresponding ingress resource table. In response to a connection request having a specific service type, the resource manager determines whether the allocated bandwidth for the specific service category is sufficient for the request and, if bandwidth is available, the resource manager incrementally allocates the bandwidth for the service category. After allocating the bandwidth, the resource manager alters the resource table to reflect the allocation by changing the corresponding "Free Flag" from "0" to "1." Consequently, the resource manager may attempt to allocate the necessary ingress bandwidth, "on the fly" as the request is received and only deny the request if the bandwidth cannot be allocated in the manner just described.

If there is sufficient ingress bandwidth, the process proceeds to step 412 where the resource manager employs the node's routing tables, as previously described in the discussion related to FIG. 3, to determine whether the node is the final destination for the related CBR traffic. If the node is the final destination, the process proceeds to step 414 where the resource allocation state is updated, that is the resource availability information is modified, and a request acceptance is returned. From step 414 the process proceeds to end in step 410. If, on the other hand, the node is not the final destination for the CBR traffic, the process proceeds from step 412 to step 416. In step 416, based upon information contained within the CBR request, the next node and corresponding egress link are computed and the egress link's resource table is located. The process then proceeds to step 418, where the resource manager examines the egress link's corresponding egress resource table. If resources have not yet been allocated for CBR traffic to the destination address, the egress resource table for the link will not have an entry for that address. Therefore, if the resource manager determines that there is no entry within the resource table for the destination address, the process proceeds to step 424, which will be described after step 422.

On the other hand, if there is an entry for the destination address, the process proceeds to step 420 where it is determined whether the bandwidth allocated for CBR traffic to the destination address is sufficient for the current request. If there is sufficient bandwidth, the process proceeds to step 422 where the request is accepted, the available bandwidth information is modified to reflect the allocation of bandwidth to the traffic whose request has just been accepted, and the process proceeds to end in step 410. If, in step 420, it is determined that there is insufficient available bandwidth, the process proceeds to step 424. In step 424 the resource manager determines, from the resource table, whether there are "free" resources that may be allocated to CBR traffic for the destination address that are sufficient to handle the CBR request. If there are not, the process proceeds to step 426, where the request is denied, and, from there, to end in step 410. If, on the other hand, it is determined in step 424 that there are sufficient "free" resources to handle the CBR request, the process proceeds to step 428. In step 428, the CBR request is marked as a "passthrough" request and sent to the next node, which may or may not be the destination node. The resource manager then awaits a reply from the next node indicating whether the remaining node(s) in the path, including the egress node, accept the CBR request.

If the response from the remaining nodes is a request rejection, or timeout, the process proceeds to step 426 and from there as previously described. If the response is an acceptance from the other nodes, the process proceeds to step 432, where the resource manager accepts the CBR request. Additionally, the resource manager updates the egress resource table entry by setting the Free Flag to "1", sets the destination address entry as the destination address of the CBR request, modifies the available bandwidth entry by subtracting the bandwidth required for the CBR traffic request just accepted and sets the status as "Add". The CBR bandwidth that is subtracted from the table's available bandwidth entry is indicated by the PCR parameter of the CBR service request. From step 432 the process proceeds to end in step 410.

Returning to step 404, the resource manager determines whether the resource table indicates that resources are free to service the incoming CBR traffic and, if not, the process proceeds to step 434 where the node rejects the request and, from there, to end in step 410. If the resource entry indicates there are resources available for the requesting traffic, the process proceeds to step 436, where the resource manager determines whether the node is the destination of the CBR connection. If the node is the destination node the process proceeds to step 438, where the tributary, an OC3c for example, is provisioned as a path termination tributary, the Free Flag of the corresponding ingress resource table is set to "1" and the status is updated to "Drop", indicating that this node is the destination, or "drop" node for the corresponding traffic. The resource manager also returns an acceptance of the request and the process proceeds to end in step 410.

If the node is not the destination node for the CBR request, the process proceeds from step 436 to step 440 where, based on information contained within the CBR request, the resource manager computes the next node and corresponding egress link. The resource table for the egress link is then examined to determine whether there is a "free" resource entry. If the resource entry is not "Free", the process proceeds to step 442, where the node rejects the CBR request and, from there, to end in step 410. If the resource table entry indicates that the unit's resources are "Free" the process proceeds from step 440 to step 444 where the CBR request is forwarded to the next node and the resource manager awaits a response. When a response is received, the process proceeds to step 446 where, if the response from a downstream node is negative, the process proceeds to step 448 where the resource manager passes this rejection back to the requesting party. From step 448, the process proceeds to end in step 410. If the response from the downstream nodes were affirmative, the resource manager provisions the ingress and egress tributaries as pass-through, returns an acceptance to the requesting party and updates the ingress and egress resource tables to indicate that the status is "Pass", and the Free Flag is set equal to "1". From step 450, the process proceeds to end in step 410.

Figure 5:
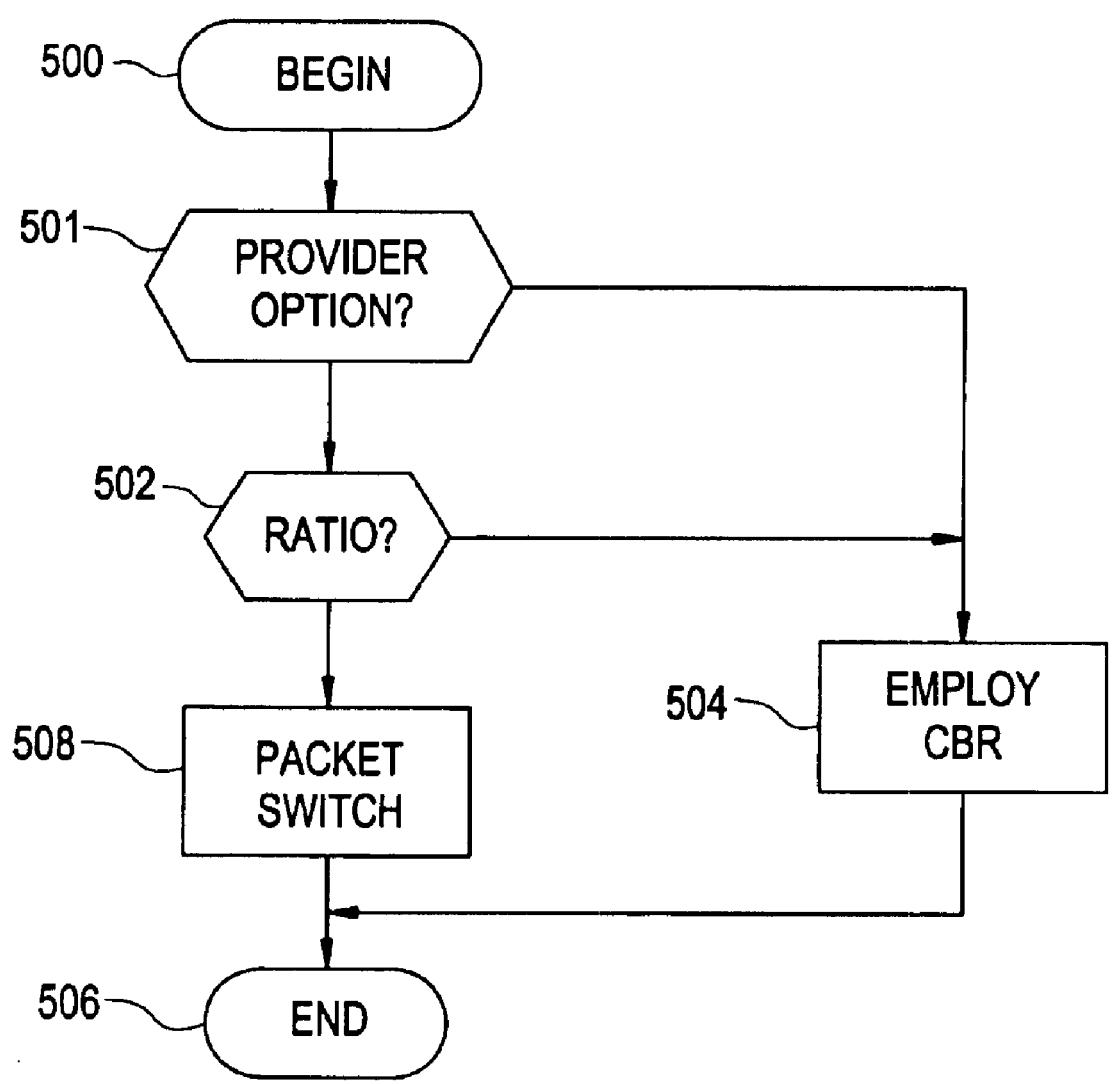
FIG. 5 is a flow chart that depicts the switching of ATM rt-VBR traffic in accordance with the principles of the present invention.

The flowchart of FIG. 5 illustrates in greater detail the process by which the resource manager 202, through connection admission control, determines the manner in which ATM traffic is to be switched, should the incoming service request indicate that the traffic is rt-VBR traffic. In one aspect of the invention, the resource manager may be instructed to route all rt VBR requests to either an STM switch or an ATM switch, at the option of a service provider, for example. Otherwise, the resource manager 202 may determine whether rt-VBR traffic should be served through a circuit path (that is, through an STM switch fabric within the hybrid switch). This determination may be based on an internal system parameter φ, a cell rate ratio threshold, as follows:

employ an STM switch for rt-VBR traffic if $$\frac{PCR}{SCR} \leq \phi$$

where:

PCR=peak cell rate

SCR=sustained cell rate

φ=cell rate ratio threshold

If the rt-VBR traffic is served by an ATM switch, the effective bandwidth required for the request may be computed based on the contents of the associated service contract. The service contract typically sets forth the required quality of service and nature of the traffic, including, for example, the average rate, burst period, and peak rate.

Requests for rt-VBR traffic may be handled as described in relation to the flow chart of FIG. 5, in which the process begins in step 500. In step 500 it is assumed that the traffic request has already been determined to be an rt-VBR request. The process proceeds to step 501, where the resource manager determines whether a service provider has elected to switch all rt-VBR traffic in the same manner as CBR traffic. This election may be evidenced by a flag that has been set, for example. If the service provider has elected to treat all rt-VBR traffic as CBR traffic, that is, in the manner described in the discussion related to FIG. 4, the process proceeds to step 504, where the procedures set forth in the discussion related to FIG. 4 are employed to switch the traffic. If the service provider has not elected in this manner to treat all rt-VBR traffic as CBR traffic, the process proceeds to step 502, where the resource manager determines whether the rt-VBR traffic is to be switched in a conventional ATM switching manner, such as a linear approximation ATM switching process, or it is to be switched in the same manner as CBR traffic. The resource manager may make this determination using the peak-to-sustained cell rate ratio, opting to switch vt-VBR traffic in the same manner as CBR traffic if the ratio is less than a predetermined threshold value, for example.

If the rt-VBR traffic is to be switched as CBR traffic, that is, in the manner described in the discussion related to FIG. 4, the process proceeds to step 504, where the procedures set forth in the discussion related to FIG. 4 are employed to switch the traffic. After switching the traffic in this manner, the process proceeds to end in step 506. If, in step 502, the resource manager 202 determines that vt-VBR traffic is to be switched using conventional ATM switching techniques, such as linear approximation, the process proceeds to step 508, where the switching takes place. From step 508, the process proceeds to end in step 506. Other types of ATM traffic may be switched using conventional ATM switching techniques.

The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention. It is intended that the scope of the invention be limited only by the claims appended hereto.

What is claimed is:

1. A hybrid telecommunications switch comprising:
   at least one circuit switched switch fabric;
   at least one packet switched switch fabric; and
   a controller configured to separate telecommunications traffic received at the hybrid switch, including asynchronous transfer mode (ATM) traffic characterized by at least one service category, and to direct traffic to either a circuit or packet switch fabric, the controller directing ATM traffic of at least one service category to a circuit switched switch fabric,
   wherein a portion of the circuit switch resources are provisioned for synchronous transfer mode (STM) traffic and the remaining portion of the circuit switch resources are allocated to ATM traffic as the controller routes the ATM traffic to the circuit switch.

2. The switch of claim 1 wherein the controller is configured to employ a connection admission control algorithm to allocate circuit switch resources to ATM traffic.

3. The switch of claim 2 wherein the controller is configured to route constant bit rate (CBR) ATM traffic to a circuit switch.

4. The switch of claim 2 wherein the controller is configured to route real time variable bit rate (rt-VBR) ATM traffic to a circuit switch.

5. The switch of claim 2 wherein the controller is configured to route ATM traffic which is neither CBR nor rt-VBR traffic to a packet switch.

6. The switch of claim 2 wherein the controller is configured to allocate available circuit switch resources, as indicated by a resource table, to received ATM traffic requests.

7. The switch of claim 6 wherein the controller is configured to maintain circuit switch ingress and egress resource tables.

8. The switch of claim 6 wherein the controller is configured to pass an ATM traffic request to a destination node and to establish an ATM traffic path after having determined that all nodes along the proposed traffic path have accepted an ATM traffic request.

9. The switch of claim 8 wherein the controller is configured to determine whether received rt-VBR ATM traffic is to be switched through a circuit switch.

10. The switch of claim 9 wherein the controller is configured to determine whether rt-VBR ATM traffic is to be switched through a circuit switch based upon the traffic's peak-to-sustained cell rate ratio.

11. The switch of claim 6 wherein the controller is configured to pass an ATM traffic request to a destination node.

12. The switch of claim 6 wherein the controller is configured to determine that all nodes, along the proposed ATM traffic path have allocated circuit switch resources for the ATM traffic.

13. The switch of claim 6 wherein the controller is configured to establish an ATM traffic path after determining that all nodes along the proposed ATM traffic path have allocated circuit switch resources for the ATM traffic.

14. The switch of claim 6 wherein the controller is configured to
   determine whether rt-VBR ATM traffic is to be switched through a packet switch fabric or a circuit switch fabric.

15. The switch of claim 14 wherein the controller is configured to compare the traffic's peak-to-sustained cell ratio to a threshold value to thereby determine whether the rt-VBR ATM traffic is to be switch through a packet switch fabric or a circuit switch fabric.

16. A method for switching telecommunications traffic in a hybrid telecommunications switch for switching asynchronous transfer mode (ATM) traffic characterized by one or more service categories, comprising at least one packet switch fabric and one circuit switch fabric, at least one circuit switch fabric, and a controller, the method including the steps of:

(A) the controller separating telecommunications traffic received at the switch, (B) the controller directing traffic to either a packet or a circuit switch fabric, with ATM traffic of at least one service category being directed to a circuit switch fabric, (C) provisioning a portion of the circuit switch resources for synchronous transfer mode (STM) traffic, and (D) allocating the remaining portion of the circuit switch resources to ATM traffic as the controller routes the ATM traffic to the circuit switch.

17. The method of claim 16 wherein the allocation of step (D) comprising the step of:

(D1) the controller employing a connection admission control algorithm to allocate circuit switch resources to ATM traffic.

18. The method of claim 16 wherein step (B) comprises the step of:

(B1) the controller routing CBR ATM traffic to a circuit switch.

19. The method of claim 16 wherein step (B) comprises the step of:

(B2) the controller routing rt-VBR ATM traffic to a circuit switch.

20. The method of claim 16 step (B) comprises the step of:

(B3) the controller routing ATM traffic which is neither CBR nor rt-VBR traffic to a packet switch.

21. The method of claim 16 wherein the allocating of step (D) comprises the step of:

(D2) the controller allocating available circuit switch resources, as indicated by a resource table, to ATM traffic requests.

22. The method of claim 16 further comprising the step of:

(E) the controller maintaining circuit switch ingress and egress resource tables.

23. The method of claim 16 further comprising the step of:

(F) the controller passing an ATM traffic request to a destination node.

24. The method of claim 23 further comprising the step of:

(G) the controller determining that all nodes along the proposed ATM traffic path have allocated circuit switch resources for the ATM traffic.

25. The method of claim 24 further comprising the step of:

(H) establishing an ATM traffic path after the determination of step (G).

26. The method of claim 24 further comprising the step of:

(I) the controller determining whether rt-VBR ATM traffic is to be switched through a packet switch fabric or a circuit switch fabric.

27. The method of claim 26 wherein step (I) comprises the step of:

(II) the controller comparing the traffic's peak-to-sustained cell ratio to a threshold value.

28. A hybrid telecommunications switch comprising:

at least one circuit switched switch fabric;

at least one packet switched switch fabric; and a controller configured to separate telecommunications traffic received at the hybrid switch, including asynchronous transfer mode (ATM) traffic characterized by at least one service category, to direct traffic to either a circuit or packet switch fabric, to employ a connection admission control algorithm to allocate circuit switch resources to ATM traffic, and to route constant bit rate (CBR) ATM traffic of at least one service category to a circuit switched switch fabric, wherein a portion of the circuit switch resources are provisioned for synchronous transfer mode (STM) traffic and the remaining portion of the circuit switch resources are allocated to ATM traffic as the controller routes the ATM traffic to the circuit switch fabric.

29. The switch of claim 28 wherein the controller is configured to route real time variable bit rate (rt-VBR) ATM traffic to the circuit switch fabric.

30. The switch of claim 28 wherein the controller is configured to route ATM traffic which is neither CBR nor rt-VBR traffic to the packet switch fabric.

31. The switch of claim 28 wherein the controller is configured to allocate available circuit switch resources, as indicated by a resource table, to received ATM traffic requests.

32. The switch of claim 31 wherein the controller is configured to pass an ATM traffic request to a destination node and to establish an ATM traffic path after having determined that all nodes along the proposed traffic path have accepted an ATM traffic request.

33. The switch of claim 32 wherein the controller is configured to determine whether received rt-VBR ATM traffic is to be switched through the circuit switch fabric.

34. The switch of claim 33 wherein the controller is configured to determine whether rt-VBR ATM traffic is to be switched through the circuit switch fabric based upon the traffic's peak-to-sustained cell rate ratio.

35. A method for switching telecommunications traffic in a hybrid telecommunications switch for switching asynchronous transfer mode (ATM) traffic characterized by one or more service categories, comprising at least one packet switch fabric and one circuit switch fabric, at least one circuit switch fabric, and a controller, the method including the steps of:

(A) the controller separating telecommunications traffic received at the switch, (B) the controller directing traffic to either a packet or a circuit switch fabric, with CBR ATM traffic of at least one service category being directed to the circuit switch fabric, (C) provisioning a portion of the circuit switch resources for synchronous transfer mode (STM) traffic, and (D) allocating the remaining portion of the circuit switch resources to ATM traffic as the controller routes the ATM traffic to the circuit switch fabric.

36. The method of claim 35 wherein step (B) comprises the step of:

(B2) the controller routing rt-VBR ATM traffic to the circuit switch fabric.

37. The method of claim 35 wherein step (B) comprises the step of:

(B3) the controller routing ATM traffic which is neither CBR nor rt-VBR traffic to the packet switch fabric.

38. The method of claim 35 further comprising the step of:

(E) the controller passing an ATM traffic request to a destination node.

39. The method of claim 38 further comprising the step of:

(F) the controller determining that all nodes along the proposed ATM traffic path have allocated circuit switch resources for the ATM traffic.

40. The method of claim 39 further comprising the step of:

(G) the controller determining whether rt-VBR ATM traffic is to be switched through the packet switch fabric or the circuit switch fabric, by comparing the traffic's peak-to-sustained cell ratio to a threshold value.

41. The switch of claim 31 wherein the controller is configured to determine whether rt-VBR ATM traffic is to be switched through the packet switch fabric or the circuit switch fabric by comparing the traffic's peak-to-substained cell ratio to a threshold value.

\* \* \* \* \*